(12) United States Patent  
Dayan (10) Patent No.: US 9,047,348 B2  
(45) Date of Patent: Jun. 2, 2015

(54) EVENT CORRELATION IN CLOUD COMPUTING

(75) Inventor: Tal Dayan, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 746 days.

(21) Appl. No.: 12/841,371

(22) Filed: Jul. 22, 2010

(65) Prior Publication Data

US 2012/0023221 A1    Jan. 26, 2012

(51) Int. Cl.
| | |
|---|---|
| *G06F 15/173* | (2006.01) |
| *G06F 11/30* | (2006.01) |
| *G06F 17/30* | (2006.01) |
| *H04L 12/24* | (2006.01) |
| *H04L 12/26* | (2006.01) |

(52) U.S. Cl.
CPC ......... *G06F 11/3055* (2013.01); *H04L 41/0686* (2013.01); *H04L 41/065* (2013.01); *G06F 11/3006* (2013.01); *G06F 17/30997* (2013.01); *H04L 43/0852* (2013.01); *H04L 43/106* (2013.01); *H04L 41/0631* (2013.01)

(58) Field of Classification Search
CPC ............ G06F 11/3055; G06F 11/3006; G06F 17/30997; H04L 43/0852; H04L 43/106; H04L 41/0631; H04L 41/065; H04L 41/0686
USPC ........................................................ 709/224
See application file for complete search history.

(56) References Cited

U.S. PATENT DOCUMENTS

| | | | | |
|---|---|---|---|---|
| 6,138,121 | A  * | 10/2000 | Costa et al. ........................... 1/1 |
| 7,082,463 | B1 * | 7/2006  | Bradley et al. ................ 709/223 |
| 8,499,240 | B2 * | 7/2013  | Richstein ....................... 715/703 |
| 2002/0158908 | A1 * | 10/2002 | Vaajala et al. ................ 345/767 |
| 2004/0093361 | A1 * | 5/2004 | Therrien et al. ............... 707/204 |
| 2008/0126858 | A1 * | 5/2008 | Barras ............................ 714/25 |
| 2009/0300210 | A1 | 12/2009 | Ferris |
| 2010/0023949 | A1 | 1/2010 | Jackson |
| 2010/0088150 | A1 | 4/2010 | Mazhar et al. |
| 2011/0131316 | A1 * | 6/2011 | Ferris et al. ................... 709/224 |
| 2011/0154320 | A1 * | 6/2011 | Verma ................................ 718/1 |

OTHER PUBLICATIONS

Kirschen, D. and Wollenberg, B. "Intelligent Alarm Processing in Power Systems". Proceedings of the IEEE. vol. 80., No. 5, May 1992, pp. 663-672.*

(Continued)

*Primary Examiner* — John Macilwinen
(74) *Attorney, Agent, or Firm* — Lerner, David, Littenberg, Krumholz & Mentlik, LLP (57) ABSTRACT

The present invention pertains to cloud computing systems and handling of events that occur in the cloud. A correlation system obtains and analyzes various events to obtain comprehensive information about the behavior of the cloud. An event repository receives and maintains time-stamped events, which may be obtained from the cloud itself or from external sources reporting on the cloud. A query engine is employed to select, filter and aggregate events from the event repository. The query engine may take into account metadata which describes relationships between different parts of the cloud. Results from the query engine may be presented on a display or otherwise reported. Using such information, the system may fix known problems or change certain parameters to improve the cloud computing process.

24 Claims, 5 Drawing Sheets

(56) References Cited

OTHER PUBLICATIONS

International Search Report and Written Opinion for PCT/US2011/044958 dated Mar. 28, 2012.

SonjaHickey, "Smart Plug-Ins (SPIs) and Agent-Based/Agentless Data 1-21 Collection Explained: What you need to manage your IT environment", Retrieved from http: //h30499. www3.hp.com/t5/lInfrastructure-Management/Smart-Plug-Ins-SPIs-and-Agent-Based-Agentless-Data-Collection/ba-p/2409421. Feb. 16, 2010. See section "Agent-based data collection explained".

* cited by examiner

FIG. 2A

EVENT CORRELATION IN CLOUD COMPUTING

BACKGROUND OF THE INVENTION

1. Field of the Invention

The present invention relates generally to cloud computing systems. More particularly, the present invention relates to collection and analysis of system events and correlation of such events with application behavior.

2. Description of Related Art

Cloud computing is a popular trend in modern computing. It disassociates applications and services from the underlying infrastructure resources such as servers, storage and networks. This permits a scalable and reliable architecture to run a large number of applications with flexible resource utilization. However, cloud computing come at a cost of increase complexity and interdependency between the various parts of the computing system.

For instance, when running an application or a service in a cloud environment, the behavior of the application or service depends on a large number of variables that are typically not visible to the application or service owner. This includes, for example, hardware malfunctions, network problems, power issues, system overload, system maintenance periods, peak traffic in adjacent applications, storage cells getting full, and so on. As a result, when an application or service owner notices anomalies in the behavior of the application or service, there is typically limited visibility to the various events that caused the anomalies. Thus, the owner may not have a clear direction on how to rectify or avoid the anomalies.

Various aspects of the cloud environment may be monitored separately. In this case, the application owner should have a comprehensive understanding of the entire environment and the other services hosted by it to appropriately understand the causes of anomalies in the system. Unfortunately, it is highly challenging to identify all the events and interactions that affect a certain application X (e.g. an adjacent services Y had a large data push that caused an overload on a disk array that is used also by a file system that is used by application X). As a result, the application owner is often at a loss to determine what caused degradation in the application. This may result in reduced system performance and may impact growth of the system in the future.

SUMMARY OF THE INVENTION

In accordance with one embodiment of the invention, a processing system for event correlation in cloud computing is provided. The processing system comprises an event repository for receiving and storing a plurality of events concerning behavior of a cloud computing environment, a processor coupled to the event repository, memory for storing data, the memory being coupled to the processor, and a query engine module managed by the processor. The query engine module is configured to filter and aggregate selected ones of the plurality of events stored in the event repository based upon a query, and to output the filtered and aggregated events for presentation to a user.

In one example, the system correlates the output events with a latency graph and displays the correlation on a display. In another example, at least some of the plurality of events are monitoring events provided by a monitoring system of the cloud computing environment. Each of the monitoring events identifies a behavior of a portion of the cloud computing environment. In a further example, each of the plurality of events stored in the event repository includes a time stamp.

Here, at least some of the plurality of events stored in the event repository desirably contain at least one of a time range, a scope of the event, a severity of the event or a source of the event.

In another example, the system further comprises an event browser coupled to the processor and configured to receive event requests and to identify given ones of the plurality of events in the event repository corresponding to the event requests. In yet another example, the system further comprises a facility module coupled to the processor and query engine module. The facility module is configured to issue reports regarding health and behavior of the cloud computing environment based on identified ones of the plurality of events stored in the event repository.

In one alternative, the processor comprises a multiprocessor architecture having a plurality of processors, and the query engine module includes multiple applications distributed for execution by the plurality of processors. In another alternative, the event repository comprises at least one logical data center.

In accordance with another embodiment of the invention, an event correlation processing system is provided. The system comprises memory for storing data regarding a cloud computing environment, a processor coupled to the memory, and a query engine module managed by the processor. The query engine module is configured to filter events identifying behavior of the cloud computing environment based upon a query, perform event correlation among the filtered events, perform event aggregation on the correlated events, and generate a data view to select a subset of the events matching the query and configure the generated data view for display on a display device.

In one example, filtering the events includes selecting events that are relevant to the query and ignoring any events that are not relevant to the query. In another example, the system further comprises a redundancy monitor to log each event associated with multiple sensor devices. In a further example, the data view generation matches underlying events to a display setting of the display device. In another example, the system further comprises an event repository for buffering selected events concerning behavior of the cloud computing environment and providing the selected events to the query engine module.

In another example, the query engine module is further configured to perform overing of existing events. In this case, performing the overing desirably includes performing logging and versioning of the existing events for auditing and recovery.

In accordance with a further embodiment of the present invention, a method of event correlation in cloud computing is provided. The method comprises receiving a plurality of events concerning behavior of a cloud computing environment; filtering the plurality of events based upon a query; performing event correlation among the filtered events; performing event aggregation on the correlated events; and generating a data view to select a subset of events matching the query for display.

In one example, performing the event correlation includes correlating the filtered events with a latency graph. In another example, the method further comprises issuing a report regarding health and behavior status of the cloud computing environment based on the query. In a further example, the method further comprises performing overing of existing events. Here, performing the overing may include performing logging and versioning of the existing events for auditing and recovery.

DETAILED DESCRIPTION

The aspects, features and advantages of the present invention will be appreciated when considered with reference to the following description of preferred embodiments and accompanying figures. The same reference numbers in different drawings may identify the same or similar elements. Furthermore, the following description does not limit the present invention; rather, the scope of the invention is defined by the appended claims and equivalents.

Figure 1:
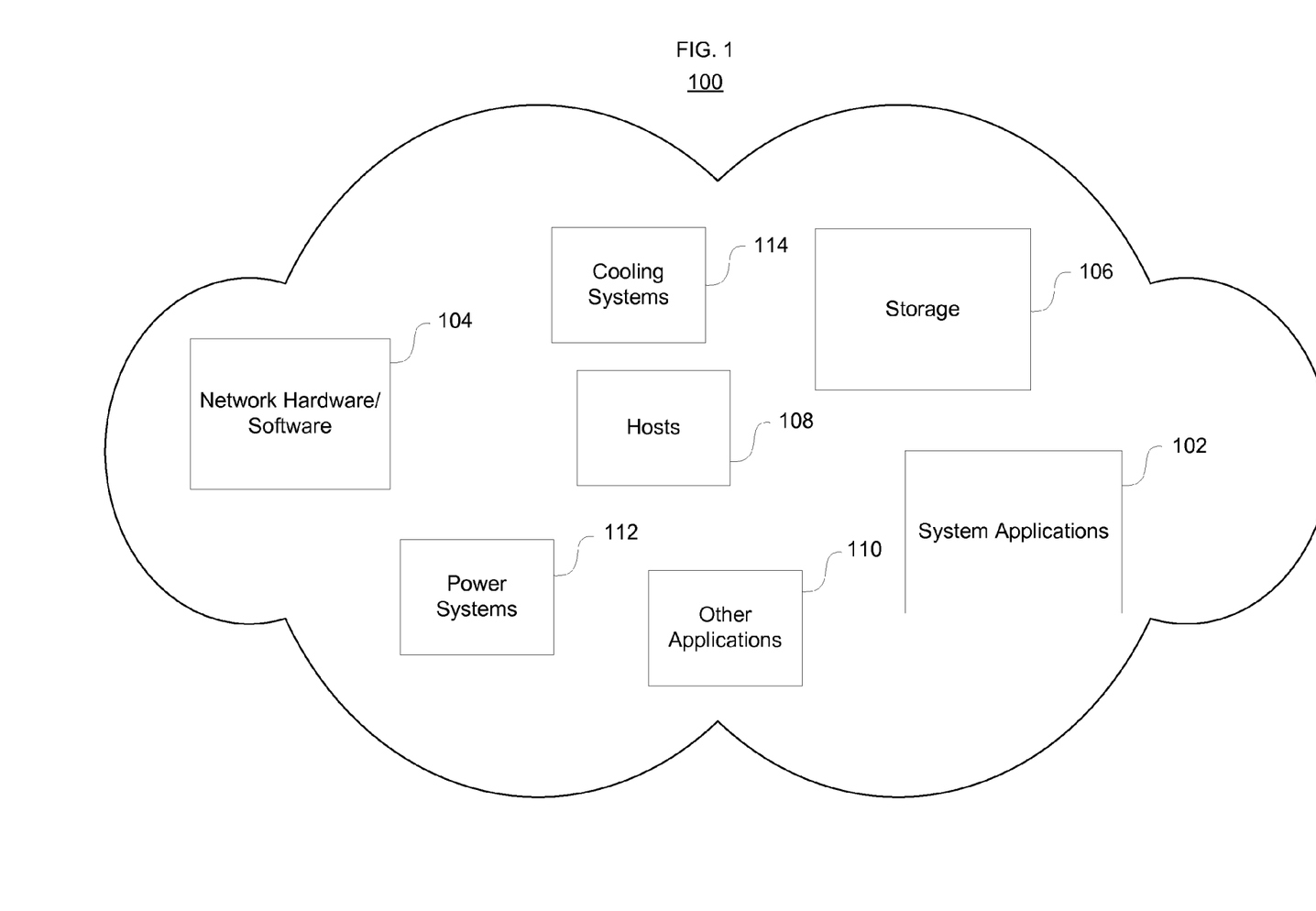
FIG. 1 illustrates a cloud computing environment in accordance with aspects of the invention.

FIG. 1 illustrates an exemplary cloud computing environment 100 in accordance with aspects of the present invention. The cloud computing environment 100 contains various parts including system applications 102, network hardware and software 104, storage 106 such as hard drive, optical recording media and the like, hosts 108 such as application or web servers, other applications 110 and power systems 112 and cooling systems 114 for running and maintaining the infrastructure effectively. Other network elements, applications and services may also be part of the cloud computing environment.

In one embodiment, a repository is provided that is fed with time stamped events about past, current and future events. The time stamped events may be obtained from data centers associated with the cloud computing environment 100. The events are fed from many sources to have as comprehensive information as possible about the behavior of the cloud computing environment 100 and the applications hosted on it.

Figure 2:
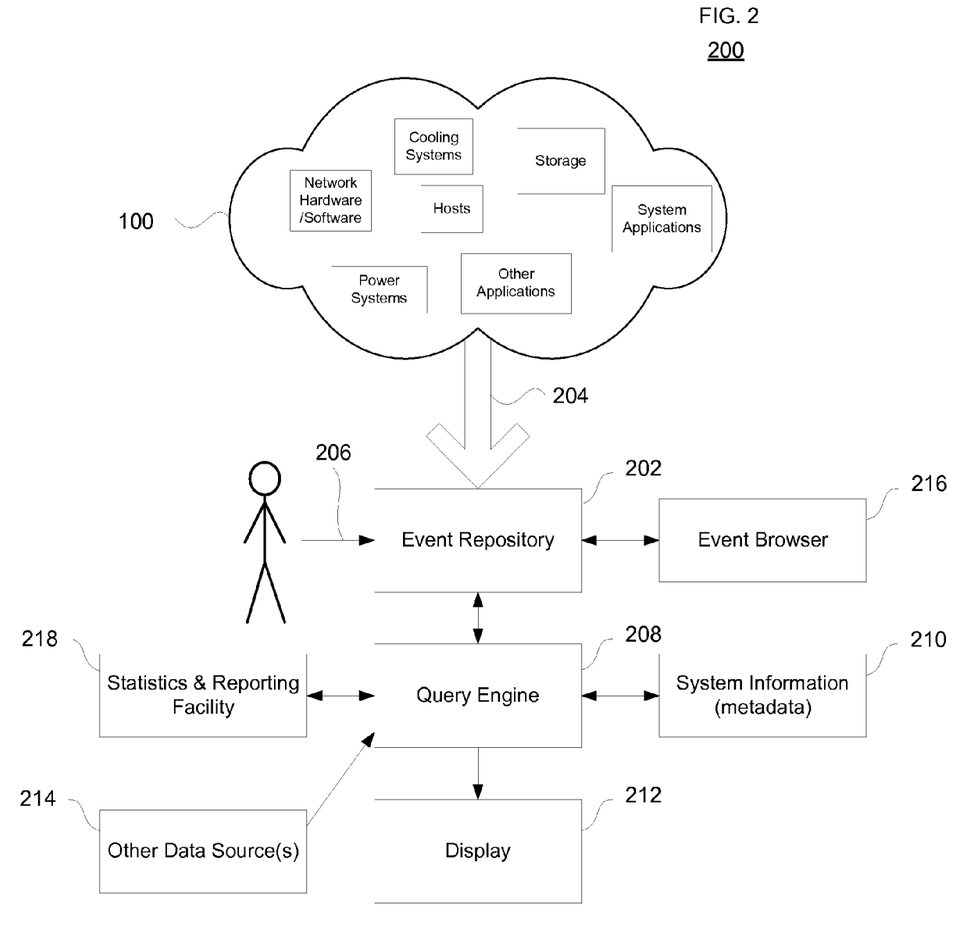
FIG. 2 illustrates a system in accordance with aspects of the invention.

FIG. 2 illustrates system 200 which includes the cloud computing environment and an event repository 202. The event repository 202 may be a central repository or a distributed repository, e.g. sharded or partitioned by a cell such as a logical data center. A single location or a building may have multiple logical data centers, each with its own storage, servers, monitoring facilities etc. Each event in the repository desirably contains, in addition to its general description, additional attributes such as time range, scope of the event, severity of the event, the source of the event, the user or application that is responsible for the event, access control information and the like.

As shown in FIG. 2, events 204 are provided from the cloud computing environment 100 to the event repository 202. The events 204 are provided by or derived from the various entities in the cloud computing environment. In one example, the events 204 include monitoring events. Here, monitoring systems observe the behavior of various parts of the cloud and the application(s) hosted on it.

Such monitoring systems may generate events representing periodic measurements or exception conditions. For instance, a monitoring system may generate events such as "network trunk X is at full capacity", "high latency from storage cell in cell Z", "denial of service attack detected from at region Y". The monitoring systems may be integral with components of the cloud computing environment 100, such as the network hardware and software 104, storage 106 and hosts 108. Alternatively, monitoring systems may include separate equipment or applications that are part of the cloud computing environment 100.

Another source of the events 204 may be a programmatic API, which is an API that allows applications and scripts to post events. For example, a data push application can post an event such as "starting data push of corpus X of size Y to cell Z." In another example, a geolocation map server can post an event such as "switching published corpus from data version X to data version Y." In yet another example, a utility script can post an event such as "draining cell X for maintenance, traffic is rerouted to cell Z."

As shown in FIG. 2, other events 206 may be provided to the event repository 202 from another source, such as a system operator. Here, a user may manually enter events using web pages, email, command-like utilities, etc. A given event may be, for example, "starting data push for application A in cell Y," "taking down cell rack Z for maintenance," or "cell B will be taken down for upgrade on Dec. 3rd, 3:40 am for 23 hours." Each event 204 or 206 may represent a point in time or a time period (e.g., between start and end time). The events stored in the event repository 202 may in the format of time series. In one example, a given variable may have a value that changes over time (e.g. "the % of down servers in cell X is ______").

The system 200 also desirably includes a query engine 208 that allows for selection, filtering and aggregation of events. The query engine 208 may be accessed in many ways. For example, a user may access the query engine 208 from a web page form, from a free text string or from a programmatic API run on a server or personal computer.

The results of the query engine 208 may also be in many different forms. For example, human readable formatted text (e.g., HTML), structure data (e.g., XML), graphs, tables, and so on may be provided. Some example of the query engine queries can be as follows: "Show all the events that can affect the connectivity from French users of YouTube last yesterday at 4 am."

The system 200 may include system information (metadata) 210 that describes the relationship between the various parts of the cloud. The metadata may be, for example, "the mapping application service is made of the distributed jobs names "mapapp-server", "mapapp-storage-backend" and "mapapp-tile-compressor") such that the query engine 208 is better able to match between events and the systems and/or applications they may affect.

During operation, the query engine 208 may receive a query and consult the event repository 202 and system information (metadata) 210. Based upon the query and the information obtained from the event repository 202 and/or the system information 210, the query engine 208 generates query results. The results are output, for example to a display 212 or other reporting system accessible to a user. The results may be combined or correlated with other data sources 214 such as a latency graph.

Figure 2A:
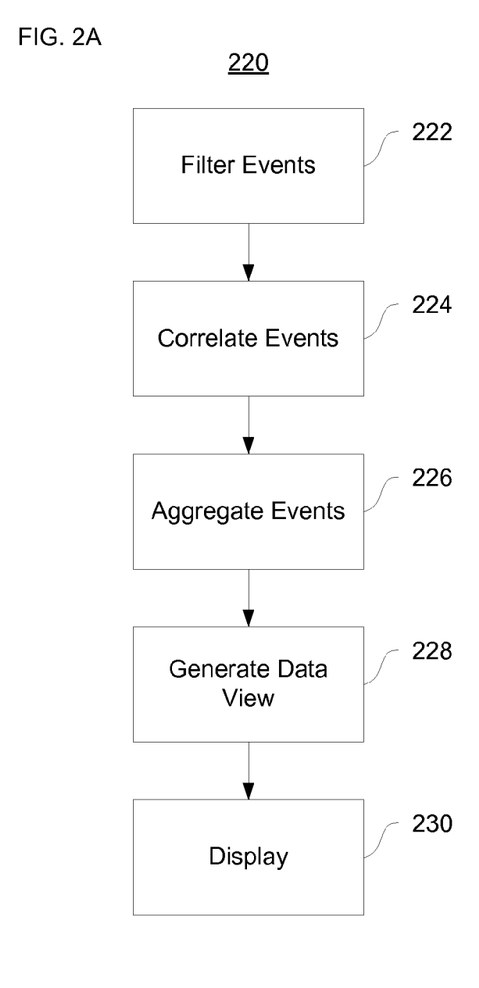
FIG. 2A illustrates a process according to aspects of the invention.

FIG. 2A illustrates a process 220 illustrating an example of the query engine's operation. In this example, the query engine 208 desirably performs the following steps. As shown in block 222, events are filtered. This selects events that are relevant to the query and ignores the ones that are not. Event correlation occurs in block 224. The repository may have multiple stored events that are actually representing the same event. For example if a redundancy monitoring system is used, each event can be logged by both the primary and secondary systems. Or, multiple temperature sensors may monitor the temperature in the same room. In block 226, event aggregation is performed. For example if there are events representing that 8,000 servers out of 10,000 have power down, the aggregation means replacing or augmenting the 8,000 events with an event to the effect that 80% of the servers have power down. As shown in block 228 is the generating data view process. Here, after the system assembles the set of relevant events, a subset of it is picked that matches the query. For example, the query may represent that the user expanded some events to get more detailed information and hid others that the user found to be not interesting at this point. This operation matches the underlying events to the actual display setting(s) of the user device. And display occurs in block 230. This includes actually displaying the data on a user's device. For example, it may include generating an HTML page and rendering it in a Web browser on a user's device.

In one alternative, the system allows "overing" (fixing) of existing events with possible logging and versioning for auditing and recovery purposes. This may be done by accessing and analyzing events in the event repository using the query engine, either alone or in conjunction with a separate computer.

In another alternative, some events may not be stored explicitly in the event repository 202, but can be recovered on demand from various data sources inside or outside of the cloud. For instance, an event such as "system X was slow at time Y" can be recovered at any time from the latency logs of system X.

In a further alternative, the system 200 may include a facility to generalize and aggregate events. This may be done with a separate server, personal computer or other processing device. For example, in the case where there are many low level events in cell X, the facility may generalize it and represent it as "widespread problems in cell X." The facility may then break it down into more details upon user request.

Returning to FIG. 2, the system 200 may also include an event browser 216 that allows user to browse and drill down in the event repository 202 to identify events relevant to his/her research. The system may also include a statistics and reporting facility 218 that generates reports about the behavior and health of the cloud based on the events stored in the repository 202. For instance, one preferred example includes a cloud application that acts as a web server and a web browser that runs on a user's computer. The web browser sends HTTP requests to the cloud application. The application performs the procedures discussed above with regard to FIG. 2A and sends the generated HTML page to the user's web browser. In this embodiment, the display block 230 may include both the HTML page generation which is done by the cloud application and the pixel rendering that is done by the user's web browser. A variation of this example employs a Java script application that runs on the user's browser and communicates with the server running as a cloud application using AJAX (Asynchronous Javascript and XML).

Figure 3:
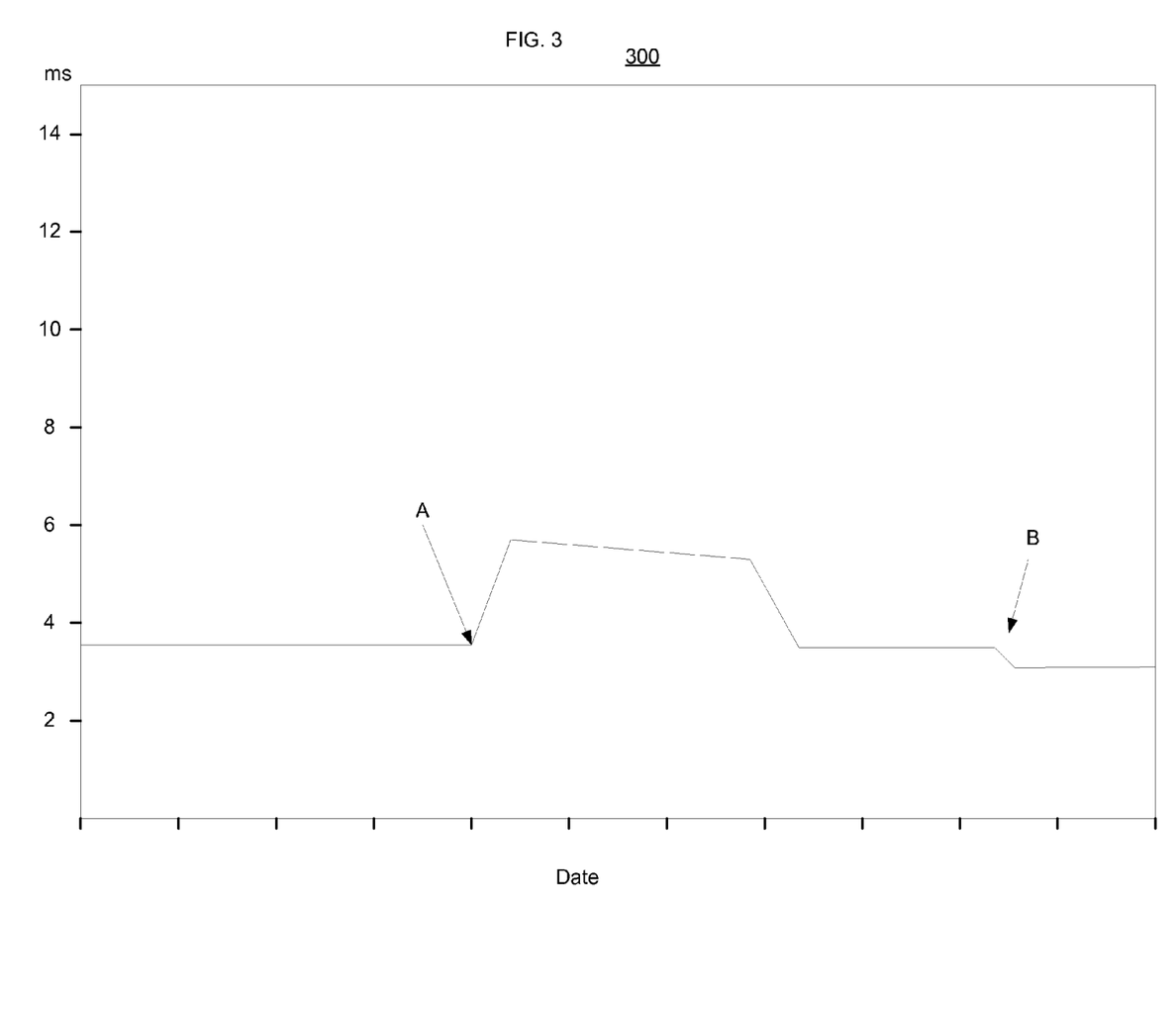
FIG. 3 is a graph illustrating aspects of the invention.

FIG. 3 shows one example 300 of displaying the results of a query. In this example, the query may represent a semantic for a mapping application such as Google's StreetView, namely, "show the main events that could effect the latency of the mapping service in the last 2 months". In this example, the query results in two events shown in FIG. 3, A and B. A may represent an event such as "pushing corpus version 64 to mapping application servers", and B may represent an event such as "upgrading Europe/US trunk capacity by 300%." The two events A and B are correlated with a latency graph of the mapping application service such that the user has more information about possible causes for changes in the latency.

The example in FIG. 3 may also include additional links that allow the user to broaden or narrow the number of events displayed, change the focus to show events of certain kind, get more detailed information about each event and so on. The user may also enter into the system events of documentation purposes, such as "at time X, mapping application service has 20% QPS increase for a period of 2 hours, explore it later in more details." Here, "QPS" stands for queries per second. For example, in Google Maps Streetview, this is the aggregated number of HTTP queries from all users within a one second period. A Streeview query can represent, for example, a request for an image tile, a request for mapping a geolocation to the ID of the closest image and so on. Every cloud application may have its own set of query types. This event may also be combined with the graph results to provide a documentation and bookmarking function that may be viewed on the display 212 or used by the statistics and reporting facility 218.

The above information may be employed by a network analyst or other user to make changes to the operation of the cloud computing system. This may also be done automatically, such as via the query engine. For example, resources may be reallocated to handle a change in traffic or a fault in the network. Additional storage or processing devices may be set aside for computationally intensive tasks. Denial of service attacks can be quickly identified and addressed.

Figure 4:
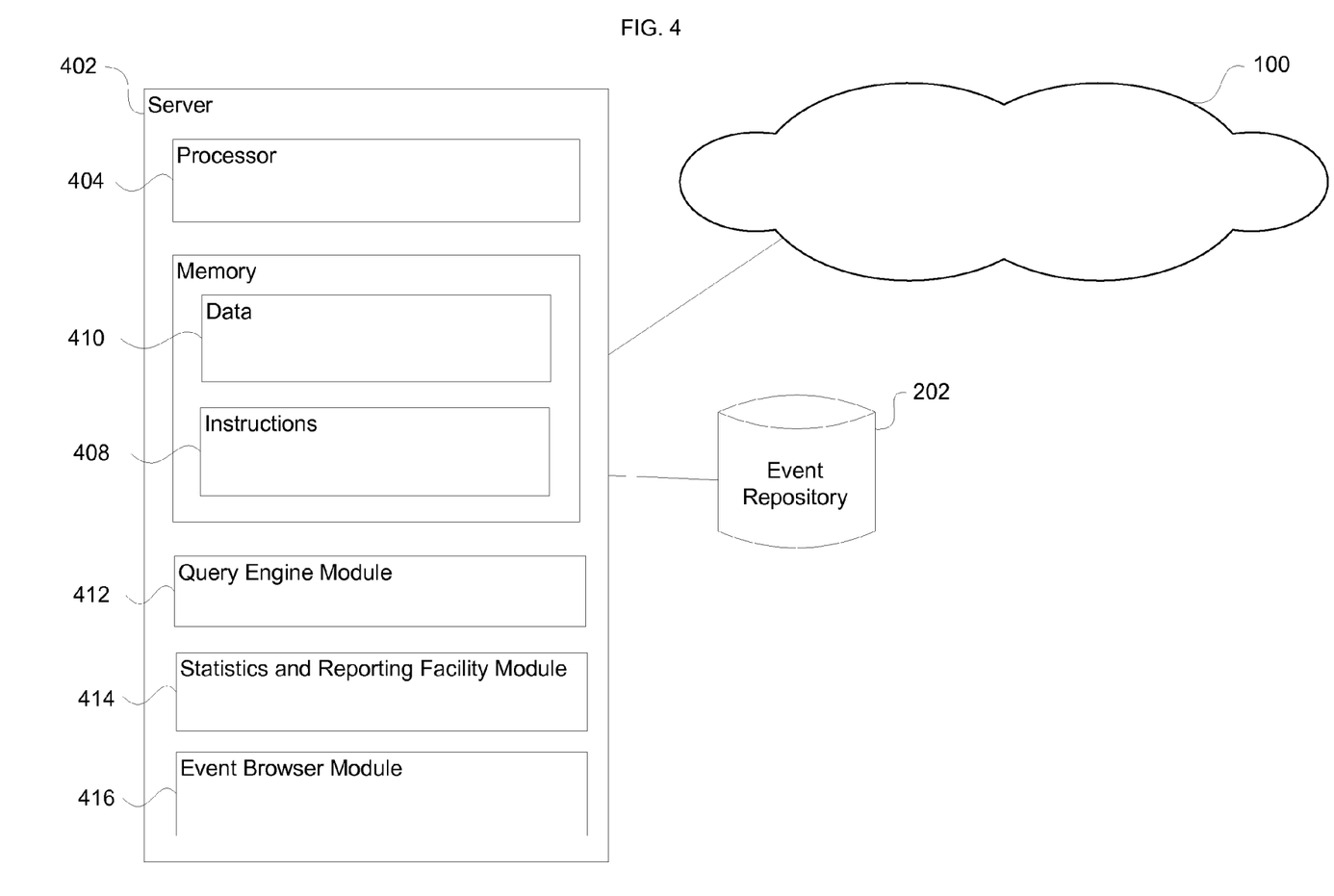
FIG. 4 is a system architecture in accordance with aspects of the invention.

Returning to FIG. 2, some or all of the components outside of the cloud computing environment 100 may be part of a computer system such as a server or personal computer. FIG. 4 illustrates one configuration of a computer such as a server 402 for implementing aspects of the system 200. As shown, the server 402 is coupled to the cloud computing environment 100, for instance via an Internet connection.

While not shown, the server 402 may include, for example, one or more user inputs such as a keyboard and mouse and/or other types of input devices such as pen-inputs, joysticks, buttons, touch screens, etc., as well as a display, which could include, for instance, a CRT, LCD, plasma screen monitor, TV, projector, etc. As shown, server 402 contains a processor 404 and memory 406.

Memory 406 stores information accessible by processor 404, including instructions 408 that may be executed by the processor 404 and data 410 that may be retrieved, manipulated or stored by the processor. The memory 406 may be of any type capable of storing information accessible by the processor, such as a hard-drive, ROM, RAM, CD-ROM, DVD, Blu-Ray disk, flash memories, write-capable or read-only memories. The processor 404 may comprise any number of well known processors, such as processors from Intel Corporation or Advanced Micro Devices. Alternatively, the processor 404 may be a dedicated controller for executing operations, such as an ASIC.

The instructions 408 may comprise any set of instructions to be executed directly (such as machine code) or indirectly (such as scripts) by the processor. In that regard, the terms "instructions," "steps" and "programs" may be used interchangeably herein. The instructions may be stored in any computer language or format, such as in object code or modules of source code. The functions, methods and routines of instructions in accordance with the present invention are explained in more detail below.

Data 410 may be retrieved, stored or modified by processor 404 in accordance with the instructions 408. The data may be stored as a collection of data. For instance, although the invention is not limited by any particular data structure, the data may be stored in computer registers, in a relational database as a table having a plurality of different fields and records, XML documents, or flat files. Map-type image data may be stored in flat files such as keyhole flat files ("KFF").

The data may also be formatted in any computer readable format such as, but not limited to, binary values, ASCII etc. Similarly, the data may include images stored in a variety of formats such as vector-based images or bitmap images using lossless or lossy encoding. Moreover, the data may include any information sufficient to identify the relevant information, such as descriptive text, proprietary codes, pointers, references to data stored in other memories (including other locations in a network) or information which is used by a function to calculate the relevant data.

Although the processor 404 and memory 406 are functionally illustrated in FIG. 4 as being within the same block, it will be understood that the processor and memory may actually comprise multiple processors and memories that may or may not be stored within the same physical housing or location. For example, some or all of the instructions and data may be stored on a computer-readable removable recording medium such as a CD-ROM, DVD or Blu-Ray disk. Alternatively, such information may be stored within a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories 406 such as hard drives, data centers, server farms or the like.

As shown, the event repository 202 may be external to the server 402. The event repository 202 may comprise one or more databases accessible by the server 402. In an alternative, the event repository 202 may be part of the server 402.

In addition, the server 402 may include modules for executing the functions of the query engine and other devices discussed above. Thus, the server 402 may include a query engine module 412, a statistics and reporting facility module 414 and an event browser module 416. Each module may execute specific instructions or applications, desirably under management of the processor 404.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Furthermore, while particular processes are shown in a specific order in the appended drawings, such processes are not limited to any particular order unless such order is expressly set forth herein.

The invention claimed is:

1. A processing system for event correlation in cloud computing, comprising:
    an event repository for receiving and storing a plurality of events, each event of the plurality of events including a statement describing a condition of a cloud computing environment;
    a processor coupled to the event repository;
    memory for storing data, the memory coupled to the processor; and
    a query engine module managed by the processor, the query engine module being configured to:
        filter selected events from the plurality of events stored in the event repository based upon a query,
        correlate similar events into a subset of the selected events derived from at least two different cloud computing part;
        generating a new aggregated event by combining the statements of the subset of events into a new statement that describes all of the conditions of the subset of selected events as a single condition of the cloud computing environment, and
        to output one or more of the filtered events and the new aggregated event for presentation to a user;
    wherein each event of the subset of selected events is received from a different device of the cloud computer environment, each statement of the subset of selected events includes a same condition, and wherein the new statement includes a percentage of devices reporting the same condition.

2. The processing system of claim 1, wherein the system displays the new aggregated event with a latency graph on a display.

3. The processing system of claim 1, wherein at least some of the plurality of events are monitoring events provided by a monitoring system of the cloud computing environment, each of the monitoring events identifying a behavior of a portion of the cloud computing environment.

4. The processing system of claim 1, wherein each of the plurality of events stored in the event repository includes a time stamp.

5. The processing system of claim 4, wherein at least some of the plurality of events stored in the event repository contain at least one of a time range, a scope of the event, a severity of the event or a source of the event.

6. The processing system of claim 1, further comprising an event browser coupled to the processor and configured to receive event requests and to identify given ones of the plurality of events in the event repository corresponding to the event requests.

7. The processing system of claim 1, further comprising a facility module coupled to the processor and query engine module, the facility module being configured to issue reports regarding health and behavior of the cloud computing environment based on identified ones of the plurality of events stored in the event repository.

8. The processing system of claim 1, wherein the processor comprises a multiprocessor architecture having a plurality of processors, and the query engine module includes multiple applications distributed for execution by the plurality of processors.

9. The processing system of claim 1, wherein the event repository comprises at least one logical data center.

10. The processing system of claim 1, wherein the new condition is generalized from the conditions of the subset of selected events.

11. The processing system of claim 1, wherein the new aggregated event replaces or augments the subset of selected events.

12. An event correlation processing system, comprising:
    memory for storing data regarding a cloud computing environment;
    a processor coupled to the memory; and
    a query engine module managed by the processor, the query engine module being configured to:
        filter events based upon a query, each filtered event including a statement describing a condition of the cloud computing environment, the filtered events being derived from at least two different cloud computing parts,
        perform event correlation among the filtered events,
        perform event aggregation by combining the statements of the correlated events into a new statement that restates the conditions of the correlated events as a single condition of the cloud computing environment, and generate a data view to select a subset of the events matching the query and configure the generated data view for display on a display device;

wherein each event of the subset of selected events is received from a different device of the cloud computer environment, each statement of the subset of selected events includes a same condition, and wherein the new statement includes a percentage of devices reporting the same condition.

13. The event correlation processing system of claim 12, wherein filtering the events includes selecting events that are relevant to the query and ignoring any events that are not relevant to the query.

14. The event correlation processing system of claim 12, further comprising a redundancy monitor to log each event associated with multiple sensor devices.

15. The event correlation processing system of claim 12, wherein the data view generation matches underlying events to a display setting of the display device.

16. The event correlation processing system of claim 12, further comprising an event repository for buffering selected events concerning behavior of the cloud computing environment and providing the selected events to the query engine module.

17. The event correlation processing system of claim 12, wherein the query engine module is further configured to perform overing of existing events.

18. The event correlation processing system of claim 17, wherein performing the overing includes performing logging and versioning of the existing events for auditing and recovery.

19. A method of event correlation in cloud computing, the method comprising:

receiving a plurality of events including a statement describing a condition of a cloud computing environment;

filtering the plurality of events based upon a query;

performing event correlation among the filtered events, the filtered events being derived from at least two different cloud computing parts;

performing event aggregation on the correlated events by combining the statements of the filtered events into a new statement that restates the conditions of the correlated events as a single condition of the cloud computing environment to create a new aggregated event; and generating a data view to select a subset of events matching the query for display;

wherein each event of the subset of selected events is received from a different device of the cloud computer environment, each statement of the subset of selected events includes a same condition, and wherein the new statement includes a percentage of devices reporting the same condition.

20. The method of claim 19, further comprising issuing a report regarding health and behavior status of the cloud computing environment based on the query.

21. The method of claim 19, further comprising performing overing of existing events.

22. The method of claim 21, wherein performing the overing includes performing logging and versioning of the existing events for auditing and recovery.

23. The method of claim 19, wherein the new condition is generalized from the conditions of correlated events.

24. The method of claim 19, wherein the new aggregated event replaces or augments the correlated events.

* * * * *